US005295567A

United States Patent [19]

Zaharia et al.

[11] Patent Number: 5,295,567

[45] Date of Patent: Mar. 22, 1994

[54] SYSTEM FOR EMERGENCY STOPPING OF ESCALATOR HANDRAIL

[75] Inventors: Vlad Zaharia, Rocky Hill; Gerald E. Johnson, Farmington, both of Conn.

[73] Assignee: Otis Elevator Company, Farmington, Conn.

[21] Appl. No.: 998,481

[22] Filed: Dec. 30, 1992

[51] Int. Cl.[5] .............................................. B65G 43/00

[52] U.S. Cl. .................................... 198/323; 198/338

[58] Field of Search ............... 198/323, 331, 335, 336, 198/338

[56] References Cited

U.S. PATENT DOCUMENTS 3,580,376 5/1971 Loshbough ......................... 198/323
4,139,810 2/1979 Ueki et al. ........................... 198/323
4,976,345 12/1990 Adrian et al. ....................... 198/323
5,072,820 12/1991 Steffen et al. ........................ 198/323
5,083,653 1/1992 Sakata et al. ......................... 198/323
5,107,975 4/1992 Iwata ................................... 198/323

*Primary Examiner*—Joseph E. Valenza

[57] ABSTRACT

Motion of the moving handrail of an escalator or moving walkway is interrupted in the event that a foreign object is carried into the handrail reentry housing area on the handrail. Handrail movement stops independently of movement of the conveyor steps, so that the handrail will stop even as the steps are still decelerating as a result of an appropriate signal from a reentry housing foreign object sensor. The handrail will be reset for further motion after the steps stop but will not commence further movement until the steps are intentionally restarted.

6 Claims, 4 Drawing Sheets

SYSTEM FOR EMERGENCY STOPPING OF ESCALATOR HANDRAIL

TECHNICAL FIELD

This invention relates to a system for stopping the movement of a handrail on an escalator or moving walkway in emergency situations. More particularly, this invention relates to an emergency handrail stopping system which will stop movement of the handrail upon receipt of a particular emergency situation signal, when the steps are stopped as a result of the same signal.

BACKGROUND ART

Handrail reentry safety devices for escalators and moving walkways are used to prevent and/or sense the entry of foreign objects on the moving walkway into the handrail reentry housing. These safety devices are intended to prevent or minimize injury to passengers or others in the vicinity of the exit landing of the escalator or walkway. The various safety devices which have been proposed include brushes and extended shrouds or hoods which border the reentry housing mouth and which are intended to prevent objects from entering the reentry housing. Such prevention devices have not proven to be 100% reliable in performing their intended function. Other proposed devices include a detector of one sort or another that senses the presence of a foreign object near the reentry housing, or that senses the entry of a foreign object into the reentry housing. These devices will typically set off an audible alarm, and then after a preset time delay, will interrupt power to the escalator so that the entire machine will be shut down. Some of these detectors will shut the conveyor off without the time delay when a foreign object is sensed in the reentry housing.

The aforesaid prior art handrail safety devices which merely sound an alarm, or merely attempt to prevent something from entering the reentry housing, when ineffective, may not prevent injury to passengers or others. The devices which turn the escalator or walkway off when a foreign object is sensed in the reentry housing may also not prevent injury due to entrapment because, in conventional escalators and moving walkways, the escalator steps and handrail are both driven by the same motor through various chain and sprocket connections. Codes require a maximum deceleration of $3ft/sec^2$ for the steps when the escalator stops. This deceleration rate has been established so as not to cause passengers who are standing on the steps to fall as a result of a sudden stopping of the steps. While this solves the problem of passengers falling as the escalator stops, it also results in continued movement of the handrail after the object has been detected on the handrail or in the reentry housing. Thus continued handrail movement can lead to entrapment of the detected object between the handrail and reentry housing.

DISCLOSURE OF THE INVENTION

This invention relates to a handrail reentry safety device which detects foreign objects on the handrail at the mouth of the reentry housing, and which, when an object is detected, immediately interrupts the driving power to the handrail. In this manner, the handrail comes to a quick stop while the steps are decelerated at a rate which lessens the chances of a passenger falling, as required by code. The device also includes a timer or the like device which reestablishes the driving connection between the main drive and the handrail after the steps have stopped moving. In this manner, when the entrapped object, if there is one, is removed from the reentry housing, and the escalator or walkway is restarted, the steps and handrail will start up in synchronism. The device of this invention can be installed as original equipment or can be retrofitted onto existing equipment. The general escalator structure disclosed in U.S. Pat. No. 5,072,820, granted Dec. 17, 1991 can be readily modified to incorporate the safety device of this invention.

The handrail drive is a belt type drive which includes a drive belt entrained about a pair of rollers, one of which is powered by the main step drive motor, via connection chains and sprockets. The other drive belt roller is a tension roller which establishes sufficient tension in the drive belt to enable the latter to drive the handrail. The drive belt engages the handrail along the latter's return run as the handrail moves over a relatively large diameter reaction roller mounted on the step chain drive sprocket axle. The area of contact between the handrail and the drive belt is thus defined by a relatively large diameter arcuate line.

It is therefore an object of this invention to provide an improved escalator or moving walkway handrail drive assembly with an enhanced safety capability for limiting entrapment injuries in the vicinity of the handrail reentry housing.

It is a further object of this invention to provide a handrail drive assembly of the character described which provides for an immediate interruption of power to the handrail drive when a foreign object is detected in the vicinity of the handrail reentry housing.

It is an additional object of this invention to provide a handrail drive assembly of the character described wherein the steps on the carrier are decelerated at a rate so as to minimize accidental passenger falls so that after the handrail stops moving, the steps will continue to decelerate.

It is another object of this invention to provide a handrail drive assembly of the character described wherein the power connection to the handrail drive is reestablished after the steps have stopped moving.

These and other objects and advantages of the invention will become more readily apparent from the following detailed description of a preferred embodiment of the invention when taken in conjunction with the accompanying drawings, in which:

BEST MODE FOR CARRYING OUT THE INVENTION

Figure 1:
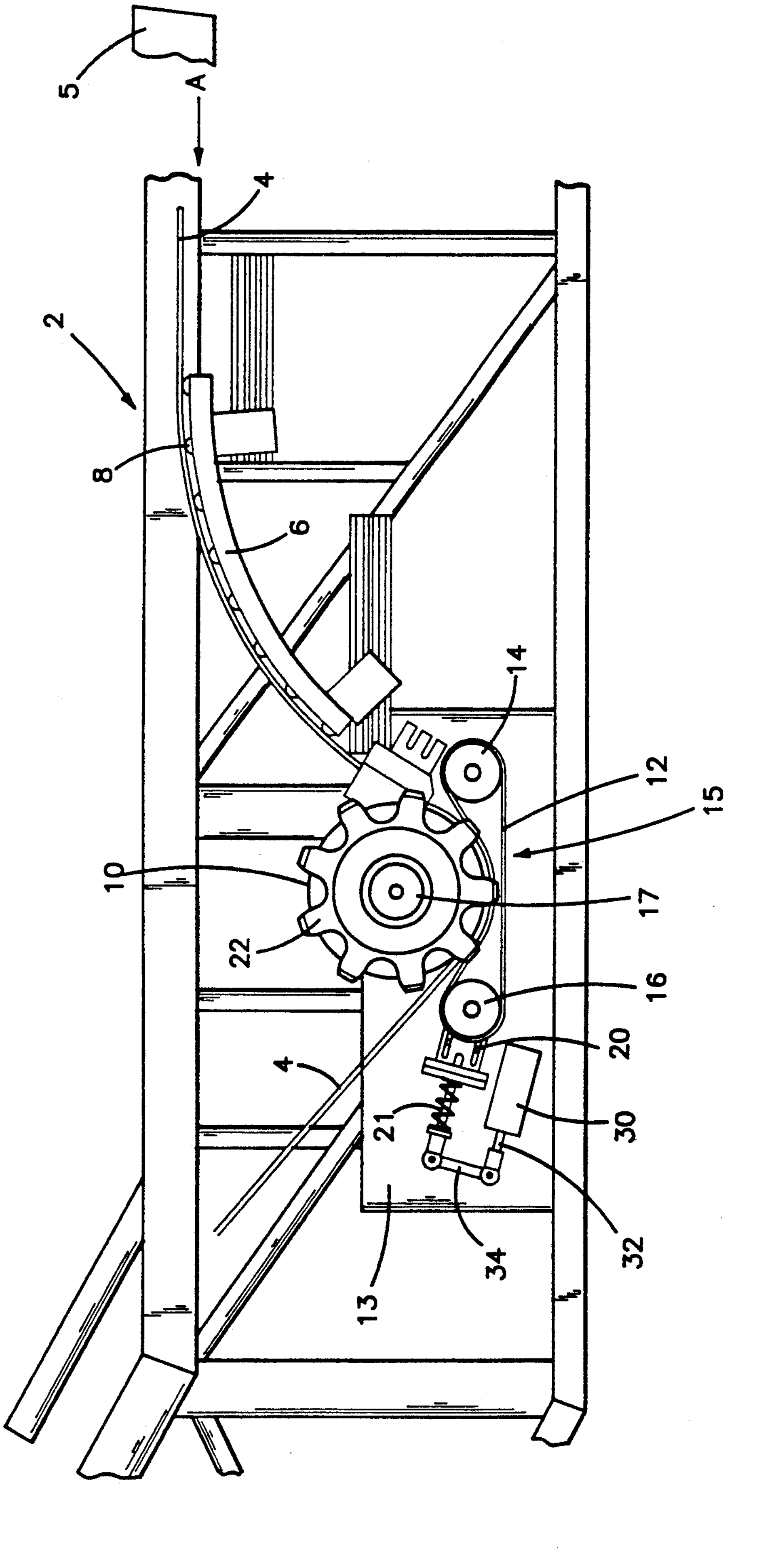
FIG. 1 is a fragmented side elevational view of an escalator handrail drive which includes the safety assembly of this invention, the entire assembly being shown in the handrail drive power-on condition.

Referring now to the drawings, there is shown in FIG. 1 a preferred embodiment of an escalator handrail drive assembly equipped with the safety device of this invention. The escalator truss is denoted generally by the numeral 2, and the handrail 4 moves over the truss 2 in the direction of the arrow A. The handrail 4 moves through the reentry housing/obstruction detector 5 to a roller bow 6 on which a plurality of guide rollers 8 are journaled. The roller box 6 is mounted on the truss 2 and guides the handrail 4 onto the reaction or backup roller 10 which is mounted on a shaft 17 on which a step chain sprocket 22 is also mounted. A plate 13 is mounted on the truss 2 and carries the handrail drive assembly, denoted generally by the numeral 15. The drive assembly 15 includes a drive belt 12 which is journaled about rollers 14 and 16. The roller 14 is a powered roller that is tied onto the main step drive (not shown), and the roller 16 is a tension roller that supplies sufficient tension to the drive belt 12 to allow it to drive the handrail 4.

Figure 2:
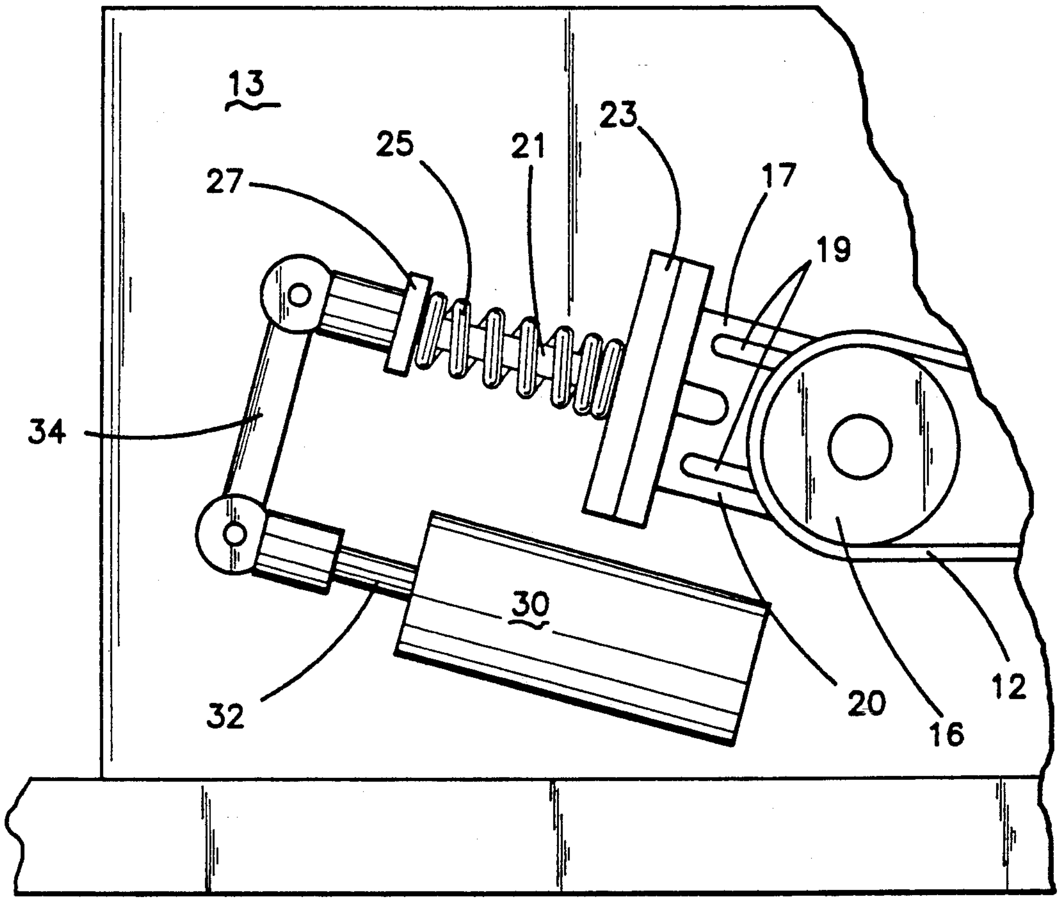
FIG. 2 is an enlarged fragmented elevational view showing details of the tension roller mount.
Figure 3:
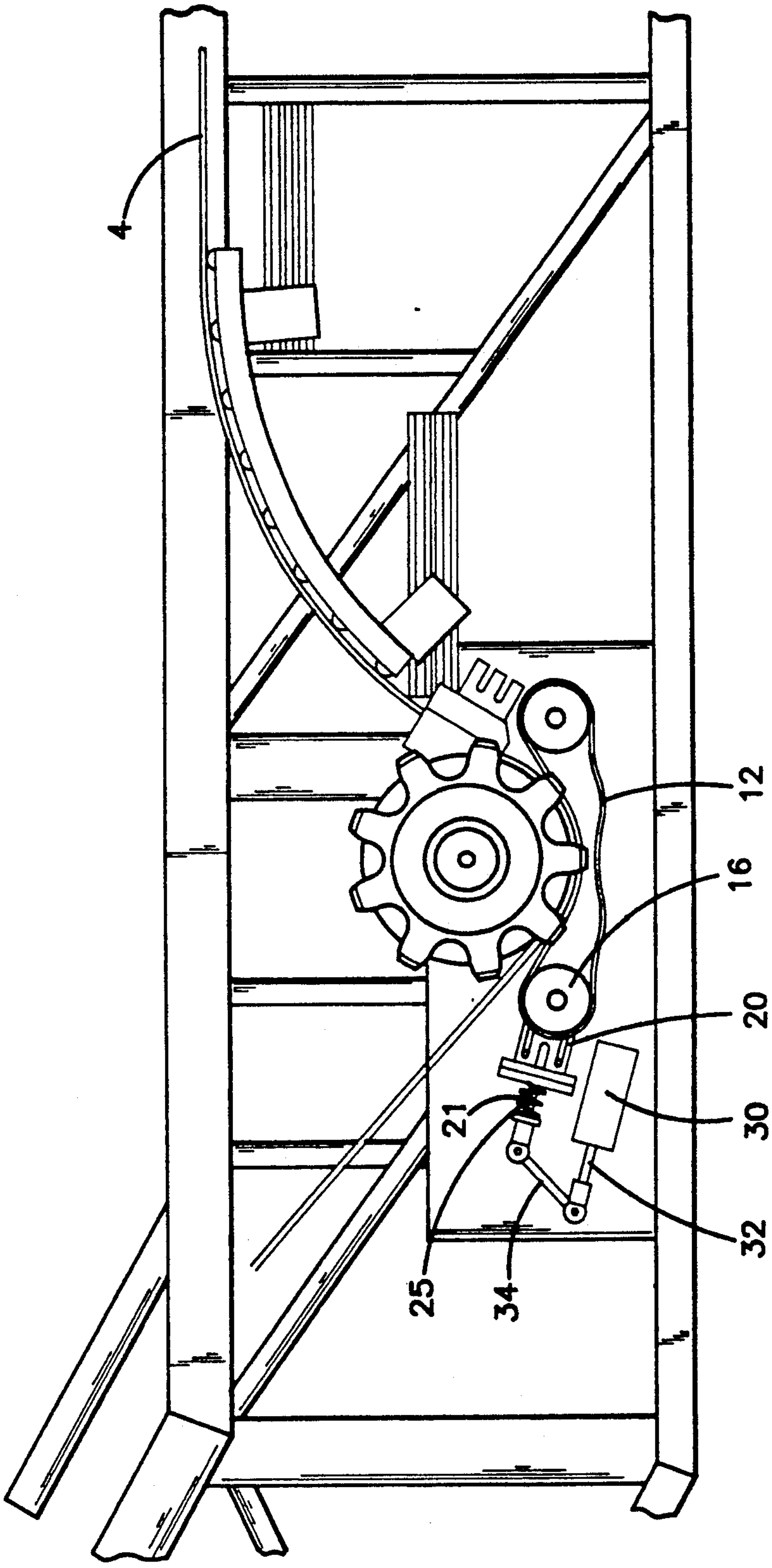
FIG. 3 is a view similar to FIG. 1 but showing the device in the handrail drive power-off condition.

Referring to FIG. 2, the tension roller 16 is mounted on a bracket 17 having a pair of elongated slots 19 which receive pins (not shown) secured to the plate 13. A rod 21 is connected to the bracket 17 and extends through a fixed plate 23 secured to the plate 13. A spring 25 is mounted on the rod 21 and engages the fixed plate 23 on one end, and a spring stop 27 mounted on the rod 21, at the other end. The spring 25 thus serves to bias the rod 21, bracket 17 and tension roller 16 to the left, as seen in FIG. 1. The spring 25 thus provides the drive belt tension for the drive 15. A solenoid actuator 30 is mounted on the plate 13, and includes a plunger 32 which is normally retracted into the solenoid core since the solenoid is normally deenergized so long as the escalator operates in a normal fashion. The plunger 32 is pivotally connected to a link 34 which in turn is pivotally connected to the tension rod 21. So long as the plunger 32 remains in its retracted position as shown in FIG. 1, while the escalator operates in proper fashion, the spring 25 will be able to hold the bracket 17 against the fixed plate 23 and apply the proper amount of tension to the roller 16 and drive belt 12. In the event that a foreign object on the handrail 4 approaches or enters the reentry housing/obstruction detector 5 so as to activate the escalator shut-down signal, the solenoid 30 will immediately be energized and the plunger 32 will be thrust to an extended position as shown in FIG. 3. The link 34 will pivot and force the rod 21 to compress the spring 25. The bracket 20 and the roller 16 will be moved to a slack position whereby the necessary drive tension in the belt 12 will be lost. The handrail 4 will thus stop moving. All of the aforesaid will occur in about 0.50 seconds, while the escalator steps are being decelerated. Step deceleration will take from about 0.75 seconds to about 1.50 seconds depending on initial step speed.

Figure 4:
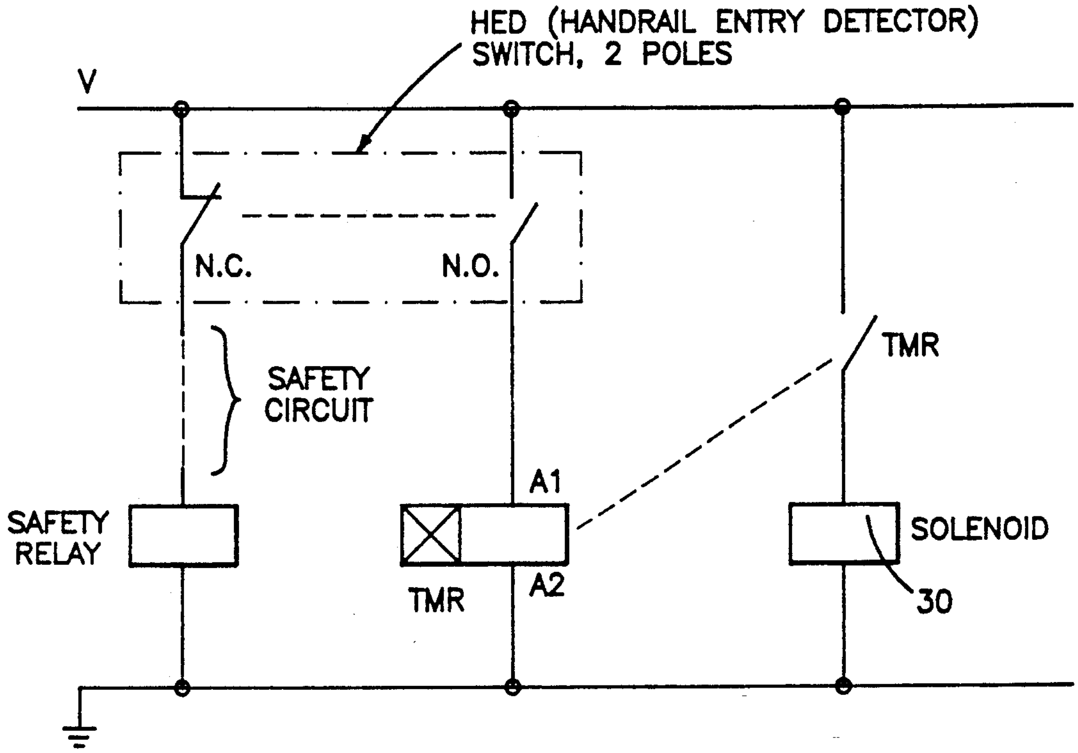
FIG. 4 is a schematic circuit diagram of the safety device of this invention.
Figure 5:
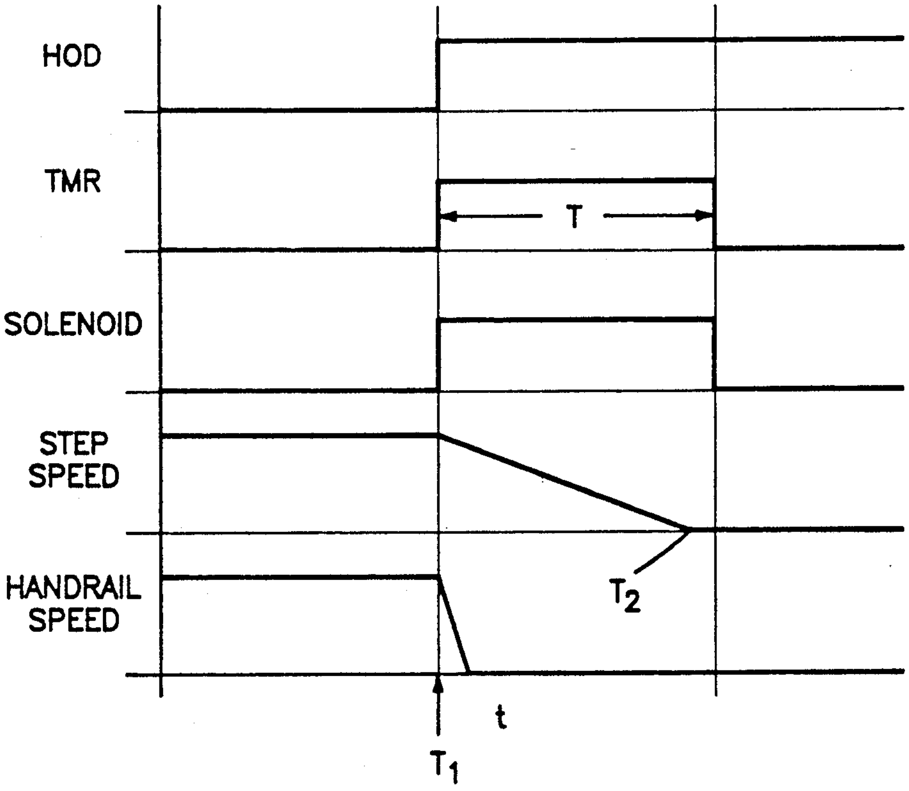
FIG. 5 is a function/time plot showing the sequence and duration of operational events which occur when a foreign object is detected at the handrail reentry.

Referring now to FIGS. 4 and 5, the mode of operation of the device is disclosed. The reentry housing/obstruction detector 5 (HOD) operates in either of two ways: a) if an object becomes caught between the handrail and the handrail guard; or b) if an object approaches the area between the handrail and handrail guard. When the device operates, the power is removed from the machine motor and brake. Assuming that the HOD operates as described in a) above, and referring to FIG. 4 the following applies.

The device consists of limit switches mounted at each handrail entry location. If an object pushes the entry guard, then the limit switch is operated. The limit switch has two contacts, one that is normally open (N.O.), the other normally closed (N.C.)—"normal" meaning that no force is exerted on the switch. The two contacts are electrically isolated, but are mechanically actuated at the same time. The N.C. contact is connected in the safety circuit. The N.O. contact is connected in the handrail stopping circuit. When the switch is operated, the N.C. contact opens the safety circuit, thus stopping the escalator; the N.O. contact closes the timer-relay, which consists of a timer (usually solid-state) and an output relay, both in the same package. The package, as shown in FIG. 4, has an input (A1, A2) and an output (TMR contact). The TMR energizes, the TMR contact closes and the solenoid is energized thus removing the tension from the handrail. At the same time when TMR energizes, the timing cycle starts. After time T, the timer-relay TMR deenergizes, contact TMR opens, the solenoid deenergizes and the handrail tension is restored. Time T is larger than time T2 to allow the escalator steps to stop before handrail tension is restored.

FIG. 5 shows the series and chronology of events when the device is actuated by a foreign object being detected by the reentry/detection device 5. In FIG. 5, the X axis is the time line, and the Y axis is an active/inactive representation of the various components of the system. The left hand end of the time line represents normal escalator operation. The obstruction detector is in a non-activated state; the timer (TMR) is off; and the solenoid is deenergized. The handrail and steps are operating at their normal speeds. At time $T_1$ an object is detected by the obstruction detector, and the latter is activated so as to concurrently start the timer TMR and energize the solenoid. At this point, power to the handrail drive is immediately interrupted, and the steps begin to decelerate. The handrail quickly stops moving, and the steps continue to decelerate through a preset time period whereby at time $T_2$, the steps will have stopped completely. After time period T the timer TMR will have run its course and will deenergize the solenoid. The tension will then be automatically restored in the handrail drive, but the handrail will not recommence movement until the escalator is intentionally restarted.

It will be readily appreciated that the handrail safety system of this invention will provide improved safety since the handrail movement will be immediately interrupted as the steps decelerate, once the handrail obstruction is detected, by effectively disconnecting the handrail drive from the handrail. Once the steps stop, and the timer deenergizes the solenoid, the drive power connection is reestablished to the handrail drive, and the handrail will recommence movement when the escalator is restarted. The system of this invention can be fitted onto an escalator as original equipment, or can be retrofitted onto existing equipment in the field.

Since many changes and variations of the disclosed embodiment of the invention may be made without departing from the inventive concept, it is not intended to limit the invention otherwise, than as required by the appended claims.

What is claimed is:

1. A system for providing emergency stopping of an escalator or moving walkway handrail, said system comprising:

a) a reentry housing through which said handrail passes at the commencement of a handrail return path of travel;

b) sensor means disposed at said reentry housing for detecting foreign objects on the handrail, said sensor means being operable to generate an obstruction signal when an object is detected on the handrail;

c) drive means including tensioned means contacting said handrail for applying a driving force to said handrail to move the latter along its path of travel; and d) means for immediately relaxing said tensioned means to disable said drive means from applying said driving force to said handrail upon generation of said obstruction signal whereby said handrail will stop moving when a foreign object is detected on said handrail.

2. The system of claim 1 further comprising means for decelerating steps on the escalator or walkway to a stop after said handrail has ceased movement.

3. The system of claim 2 further comprising means for automatically re-tensioning said tensioned means in said drive means to re-enable the latter to apply said driving force to said handrail after the steps have been brought to a stop.

4. A system for providing emergency stopping of an escalator or moving walkway handrail, said system comprising;

a) drive means for applying a driving force to said handrail, said drive means comprising a drive belt for frictionally engaging said handrail; a drive roller operably connected to a main step drive for the escalator or walkway, said drive roller engaging said drive belt to power the latter; and a tension roller engaging said drive belt to apply sufficient tension thereto to enable said drive belt to move the handrail;

b) spring means operably connected to said tension roller to supply said tension to said drive belt through said tension roller;

c) sensor means adjacent to said handrail to detect foreign objects on or near said handrail, said sensor means being operable to generate an obstruction signal upon detection of a foreign object;

d) means for decelerating steps on the escalator or walkway when said obstruction signal is generated; and e) means for disabling said spring means from tensioning said drive belt when said obstruction signal is generated so as to stop movement of said handrail before the steps are decelerated to a stop.

5. The system of claim 4 wherein said means for disabling comprises a solenoid operable upon generation of said obstruction signal to change from a first state wherein said spring means is operable to apply tension to said drive belt, to a second state wherein said spring means is inoperable to apply tension to said drive belt.

6. The system of claim 5, further comprising timer means operable to return said solenoid from said second state to said first state after the steps have been decelerated to a stop.

* * * * *